(12) United States Patent
Weisser, Jr.

(10) Patent No.: US 6,973,494 B2
(45) Date of Patent: Dec. 6, 2005

(54) SYSTEM AND METHOD FOR BI-DIRECTIONAL MAPPING BETWEEN CUSTOMER IDENTITY AND NETWORK ELEMENTS

(75) Inventor: Frank J. Weisser, Jr., deceased, late of Duluth, GA (US); by Phyllis C. Weisser, legal representative, Duluth, GA (US)

(73) Assignee: BellSouth Intellectual Property Corporation, Atlanta, GA (US)

( * ) Notice: Subject to any disclaimer, the term of this patent is extended or adjusted under 35 U.S.C. 154(b) by 840 days.

(21) Appl. No.: 09/751,469

(22) Filed: Dec. 29, 2000

(65) Prior Publication Data

US 2002/0087671 A1    Jul. 4, 2002

(51) Int. Cl.[7] ............................................. G06F 15/173
(52) U.S. Cl. .................... 709/226; 707/104.1
(58) Field of Search ............................ 709/226, 220, 709/224, 223; 370/252, 242, 230, 228; 345/734; 379/230; 707/104.1

(56) References Cited

U.S. PATENT DOCUMENTS

| | | | |
|---|---|---|---|
| 5,774,689 A | | 6/1998 | Curtis et al. .................. 703/21 |
| 6,078,926 A | | 6/2000 | Jensen et al. ........... 707/103 R |
| 6,366,954 B1 | * | 4/2002 | Traversat et al. ........... 709/220 |
| 6,385,650 B1 | * | 5/2002 | Skog et al. .................. 709/226 |
| 6,400,689 B1 | * | 6/2002 | Sato et al. .................. 370/242 |
| 6,507,565 B1 | * | 1/2003 | Taylor ......................... 370/252 |
| 6,512,824 B1 | * | 1/2003 | Hsieh et al. ................. 379/230 |
| 6,618,355 B1 | * | 9/2003 | Gulliford et al. ........... 370/230 |
| 6,717,909 B2 | * | 4/2004 | Leroux et al. .............. 370/228 |
| 6,744,446 B1 | * | 6/2004 | Bass et al. .................. 345/734 |
| 6,748,432 B1 | * | 6/2004 | Du et al. ..................... 709/224 |

* cited by examiner

Primary Examiner—Viet D. Vu
Assistant Examiner—Jungwon Chang
(74) Attorney, Agent, or Firm—Lee & Hayes, PLLC (57) ABSTRACT

Systems and methods for relating network elements to customers in a communications network using an object-oriented relational structure. The present invention is directed to systems and methods for relating network elements to customers in a communications network using an object-oriented relational structure. According to one embodiment, the object-oriented system, for relating network elements to a customer or for relating a customer to the network elements, includes a network element data module containing network element data arranged in a form that can be manipulated using an object-oriented application; a customer data module; and a mapping module in communication with the network element data module and the customer data module for creating an object-oriented model of the network elements. The output of the mapping module comprises a plurality of sub-tree layers wherein each layer represents a layer of abstraction, and wherein a root represents the highest sub-tree layer and the highest level of abstraction and a plurality of unique customer identifiers assigned to network elements that relate the customer to certain network elements.

38 Claims, 7 Drawing Sheets

SYSTEM AND METHOD FOR BI-DIRECTIONAL MAPPING BETWEEN CUSTOMER IDENTITY AND NETWORK ELEMENTS

CROSS REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of Invention

The present invention relates generally to object-oriented applications and, more particularly, to systems and methods for relating network elements to customers in a communications network using an object-oriented relational structure.

2. Description of the Background

Providers of communication services are investing in and deploying the latest generation of network equipment in an attempt to maximize network functionality in an increasingly competitive market. Such growth has exerted pressure on service providers to maintain or even improve Quality of Service (QoS). One pervasive problem affecting QoS is a service provider's inability to relate the failure of a network element, such as a switch, to the customer or customers serviced by that element. A customer, in this context, refers to a wide range of subscribers to data or telecommunications services, which may include an individual residential customer or a larger corporate enterprise. Another problem is identifying all the network elements that service a particular customer. A few vendors have offered vendor-specific solutions, but the problem persists among service providers that use equipment from many different vendors.

If network operators could identify the customer affected by, for example, a network element failure, service providers could notify that customer of the problem. Furthermore, if the information that relates the network hardware to a customer were in a convenient bi-directional format, service providers could identify all the network equipment associated with a given customer. Quick and efficient access to such information would allow service providers to significantly improve network management and QoS.

Virtually all manufacturers of network equipment use object-oriented technology to describe their products and their management systems, whether to describe an entire managed network or just a subset of components. Object-oriented technology refers to discrete data units as "objects." Each object in the object-oriented data structure represents an instance of a "class." A class abstractly defines the characteristics of similar objects by specifying their components. A class may also contain sub-classes that "inherit" the characteristics of the class from which it derived.

In a networking application, network elements (NEs) have inherent functions that can be characterized as objects. An NE is a generic term for a hardware component of a service provider's network that may range in size and significance from a power supply for an equipment frame, to a circuit pack, to an entire node. Some NEs may support a single user or customer while others may support multiple customers. A port on a circuit pack, for example, supports one customer while an equipment rack may serve several customers.

A node is an NE that refers to a stand-alone product having a programmed or engineered capability to recognize and process or forward transmissions to other nodes. For example, a node may include an external management interface that communicates with other network elements by means of circuits (e.g. T1, DS3, OC-48). Service providers use the management interface to operate, administer, provision, and maintain all the network elements within the purview of the node.

A network configuration system is needed that enables the creation and management of a network topology map that relates network elements to customers in a communications network. Such a system needs to provide sufficient flexibility to allow bi-directional searching, i.e. beginning either with a customer identifier or a network element. Moreover, the system also needs to relate customers to services where a certain network element provides multiple services. The present invention satisfies this need.

SUMMARY OF THE INVENTION

The present invention is directed to systems and methods for relating network elements to customers in a communications network using an object-oriented relational structure. According to one embodiment, the object-oriented system, for relating network elements to a customer or for relating a customer to the network elements, includes a network element data module containing network element data arranged in a form that can be manipulated using an object-oriented application; a customer data module; and a mapping module in communication with the network element data module and the customer data module for creating an object-oriented model of the network elements. The output of the mapping module comprises a plurality of sub-tree layers wherein each layer represents a layer of abstraction, and wherein a root represents the highest sub-tree layer and the highest level of abstraction and a plurality of unique customer identifiers assigned to network elements that relate the customer to certain network elements.

The system of the present invention may be used, for example, to identify which customers rely on a certain network element. The system may also be used, in a reverse manner, to identify all the network elements that support a certain customer. The present invention has several customer service benefits that derive from such network topology maps, whether developed from a customer, service, or managed network point of view. For example, the present invention may be employed by customer service personnel to identify customers affected by a network element failure. Once identified, customer service personnel can notify the customer of a maintenance or operational problem, or save a per-customer record of the event for subsequent Quality of Service (QoS) or service level agreement calculations. The present invention may also be employed, for example, at a service level where a network element provides multiple services. In this example, the present invention can be used to identify the network elements that support a certain service. This aspect of the present invention, in particular, facilitates bill preparation.

In addition to the customer service benefits, the present invention may also yield benefits from a network management standpoint. For example, the present invention uses a consistent framework to provide the desired bidirectional mapping for all products in the managed network, regardless of the equipment vendor, thereby providing a vendor independent solution to the customer-to-network mapping issue. Where the service provider controls the mapping process, the present invention gives service providers the freedom to select the form and amount of customer identification information used in the mapping process. Lastly, service providers can easily tailor the framework to accommodate a network of any size.

These and other benefits of the present invention will be apparent from the detailed description below.

DESCRIPTION OF THE FIGURES

For the present invention to be understood clearly and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention while eliminating, for purposes of clarity, other elements. For example, certain system details and modules of certain intelligent platforms are not described herein. Those of ordinary skill in the art will recognize, however, that these and other elements may be desirable in a typical network. A discussion of such elements is not provided because such elements are well known in the art and because they do not facilitate a better understanding of the present invention.

Figure 1:
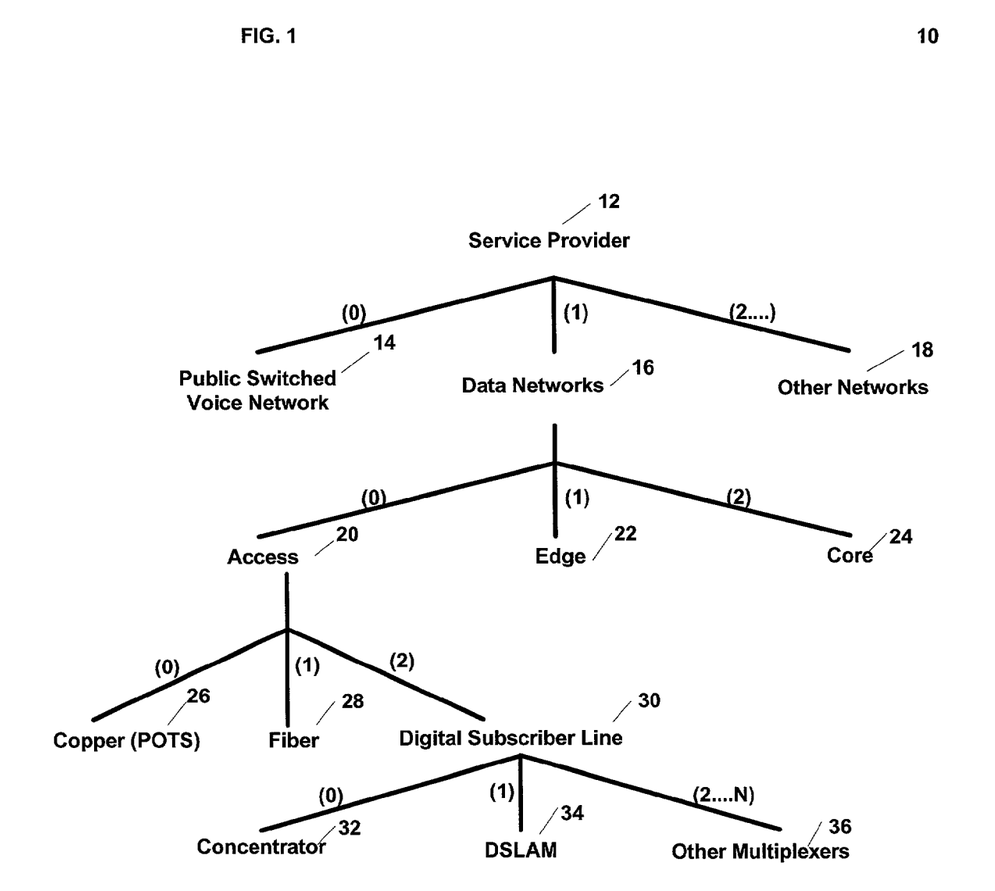
FIG. 1 is a diagram of an exemplary relational structure of objects stored in a network element database.

FIG. 1 illustrates an exemplary relational structure of objects stored in a network element database. In the network illustrated in FIG. 1, service provider 12 has the following subclasses: public switched voice network 14, data networks 16, and a collection of other networks 18. The subclasses may also be defined in terms of other subclasses. For the data networks class 16, for example, a sub-class access 20 may be defined that has all of the characteristics of data networks 16 but which also has certain characteristics unique to access 20. Those characteristics can be represented as POTS 26, fiber 28, and DSL 30. An object sub-class, such as access 20, then "inherits" the characteristics of the class from which it derived, such as data networks 16. Subclasses 32, 34, and 36 illustrate an additional level of abstraction. The sample architecture presented in FIG. 1, however, is not intended to limit the scope of the present invention to one location. In a telecommunications application, the present invention may represent, for example, a combination of equipment housed in a central office and at remote locations.

Figure 2:
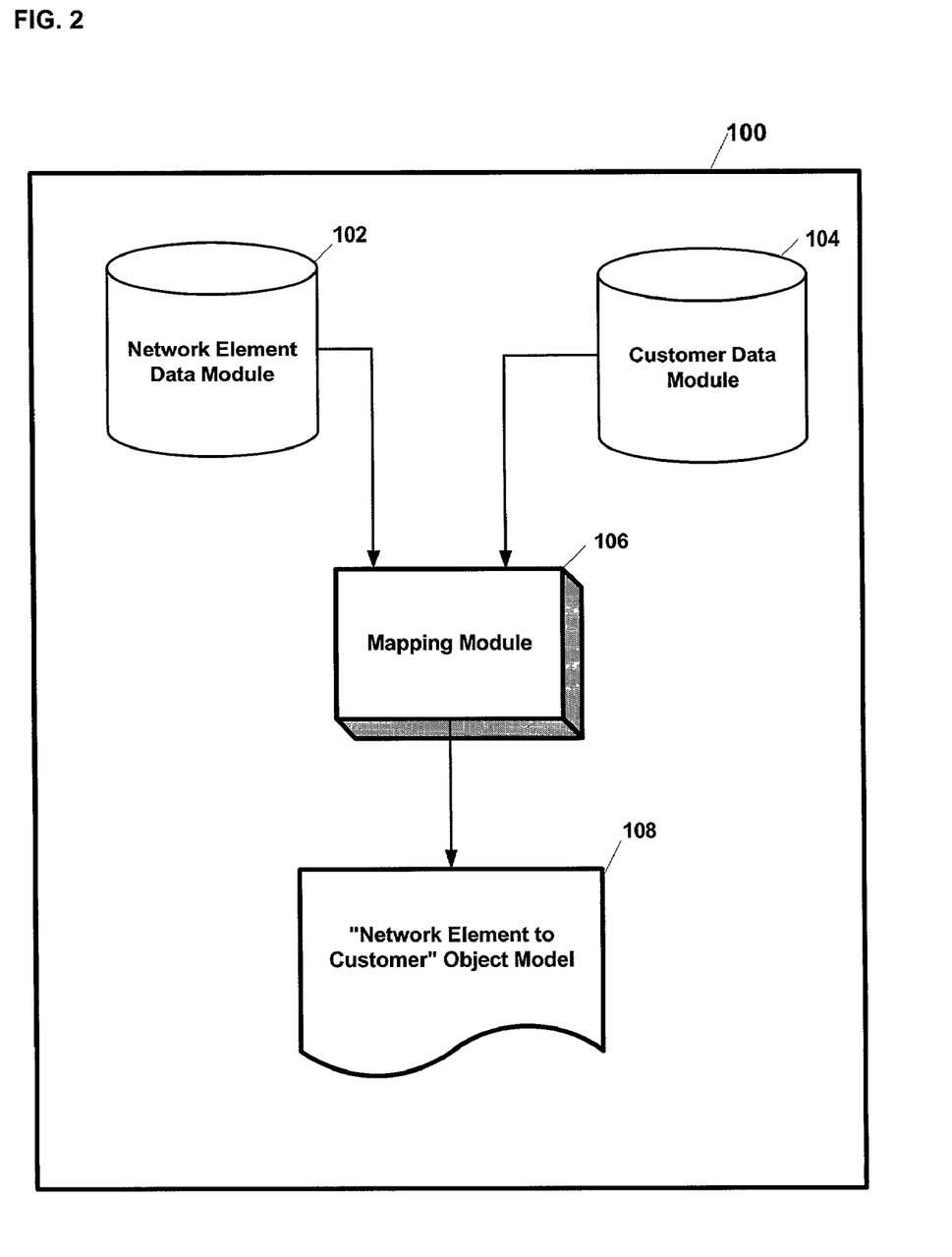
FIG. 2 is a block diagram of a system for bi-directional mapping between customer identity and network elements according to one embodiment of the present invention.

FIG. 2 is a diagram of a system 100 according to one embodiment of the present invention for relating network elements (NEs) to customers. The system 100 includes data modules 102, 104, a mapping module 106, and outputs a "network element-to-customer" object model 108. The mapping module 106 includes an object-oriented application that receives object class and customer information from data modules 102, 104 and outputs an object-oriented model 108 that relates the network elements to customers. Each module is discussed in more detail below.

Mapping module 106 may be implemented on an intelligent platform such as, for example, a computer, such as a workstation or a personal computer, a microprocessor, a network server, or an application specific integrated circuit, using any suitable type of computer instruction. According to one embodiment, mapping module 106 may be implemented as software code to be executed using any suitable computer language such as, for example, Java, C or C++ using, for example, conventional or object-oriented techniques. The software code may be stored as a series of instructions or commands on a computer readable medium, such as random access memory (RAM), read only memory (ROM), a magnetic medium such as a hard-drive or a floppy disk, or an optical medium such as a CD-ROM.

NE data module 102 may contain network element data arranged in an object-oriented data structure that can be manipulated using an object-oriented application such as an object-oriented database management system. The contents of NE data module 102 may include any combination of network hardware elements, such as those illustrated in FIG. 1, at any desirable level of detail. The mapping module 106 may receive NE data 102 and customer information data 104, for example, from a database in communication with the mapping module 106. Alternatively, NE data module 102 may be a traditional relational database linked to a system for transforming relational-database data into a form suitable for manipulation by an object-oriented application. In either case, NE data module 102 may be a network database in communication with the mapping module 106.

The customer data module 104 may contain any customer identification information necessary to identify the customer or customers relying on a certain NE. Such customer information may include, for example, customer name, telephone number or email address. Alternatively, customer data module 104 may include customer account numbers used in a separate relational database. According to another embodiment, the customer data module 104 may be developed from a "service" point of view where customers are associated with certain data or telecommunications services, in addition to a network element, when a network element is capable of delivering multiple services. For example, customer data module 104 may include separate identifiers for a customer receiving multiple services, such as DSL and telephone service.

Figure 3:
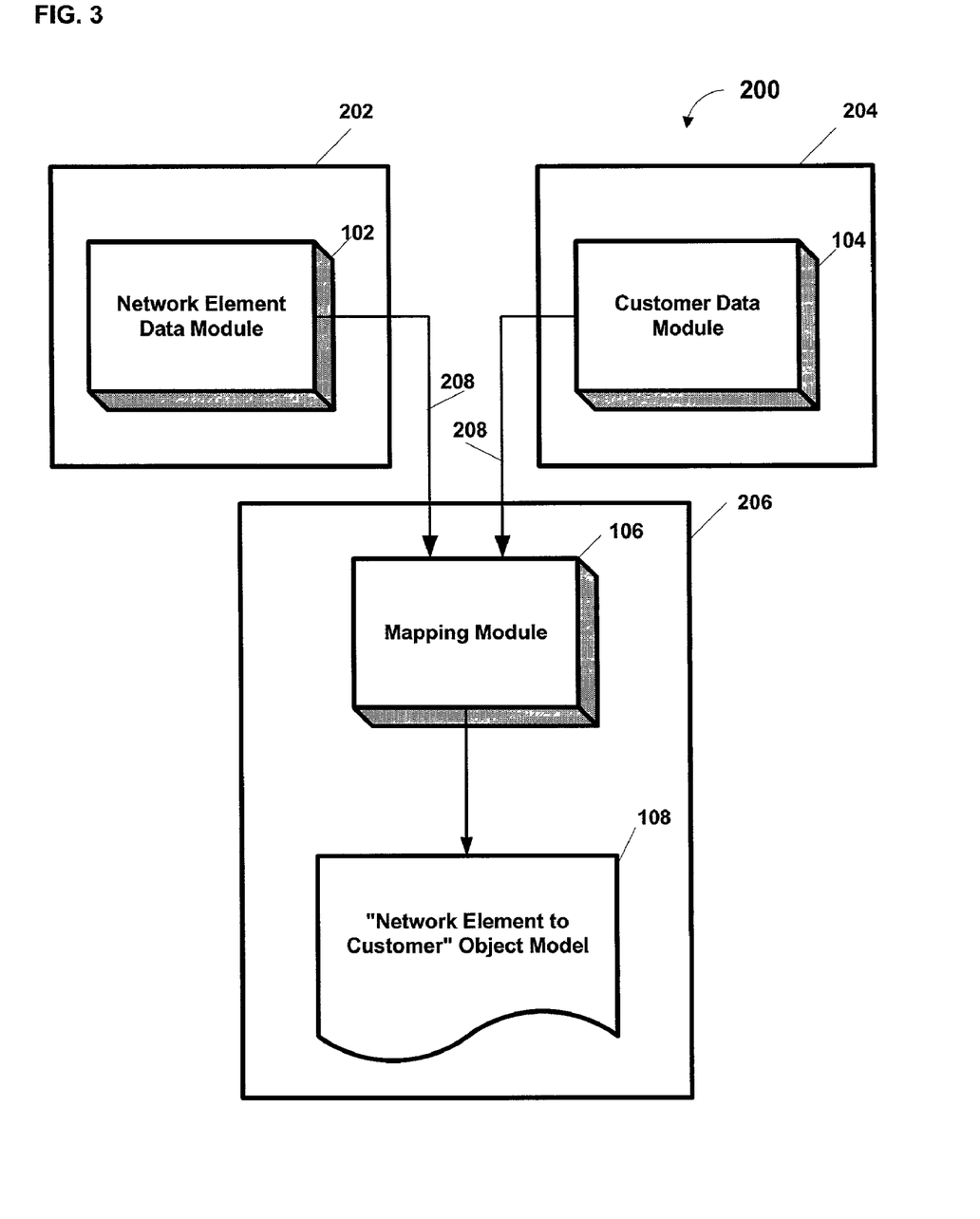
FIG. 3 is a block diagram of the system according to another embodiment of the present invention.

According to one embodiment of the present invention, the modules 102, 104, and 106 may reside on separate physical devices. FIG. 3 is a diagram of a system 200 according to such an embodiment. The system 200 includes data modules 102, 104, and 106 residing on, for example, physical devices 202, 204, and 206 respectively. Modules 102, 104, and 106 may then communicate using any appropriate data protocol 208 such as TCP/IP.

Figure 4:
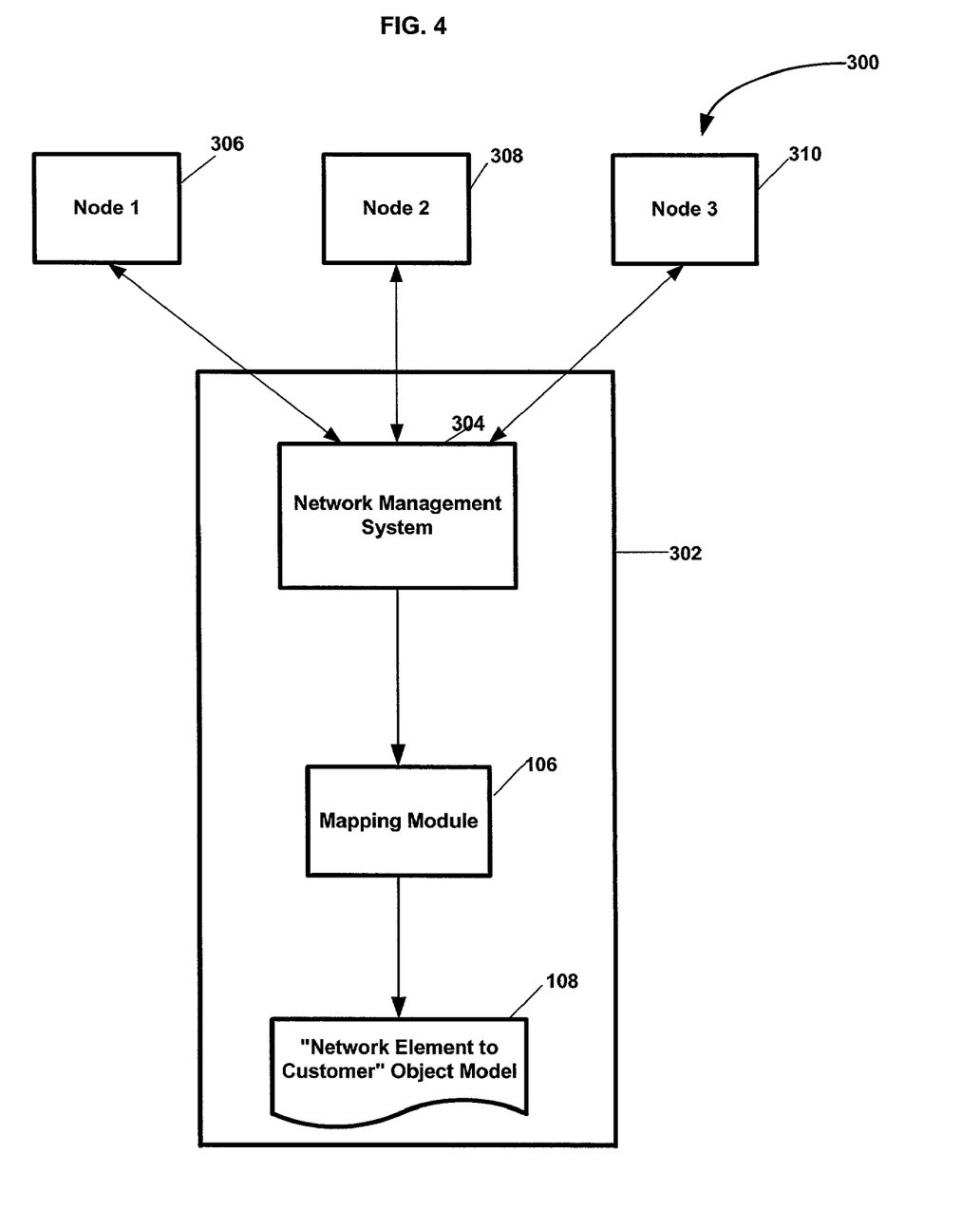
FIG. 4 is a block diagram of a system that integrates a network management system according to one embodiment of the present invention.
Figure 5:
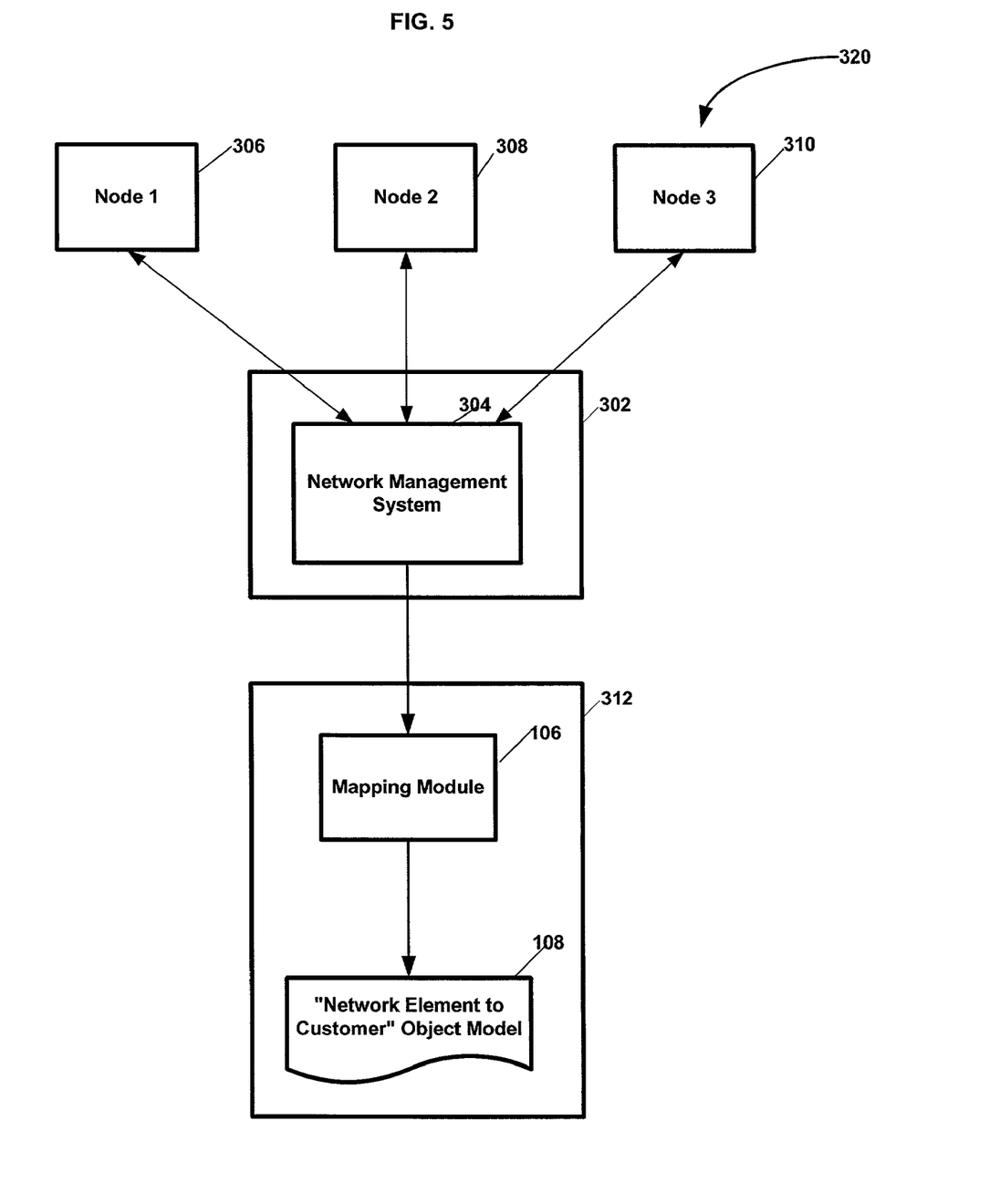
FIG. 5 is a block diagram of a system where the network management system and mapping module reside on separate physical devices according to one embodiment of the present invention.

FIG. 4 illustrates another embodiment of a network 300 where the mapping module 106, running on a system 302, may receive the content of data modules 102, 104 from another application, also running on the system 302, such as a network management system (NMS) 304, which interacts with provisioning systems to provide constantly updated records of customers and their network element usage. According to such an embodiment, the NMS 304 communicates with network nodes 306, 308, and 310 via an external management interface associated with each node. According to another embodiment, FIG. 5 shows a system 320 where the mapping module 106 resides on a physical device 312 separate from the NMS 304.

Figure 6:
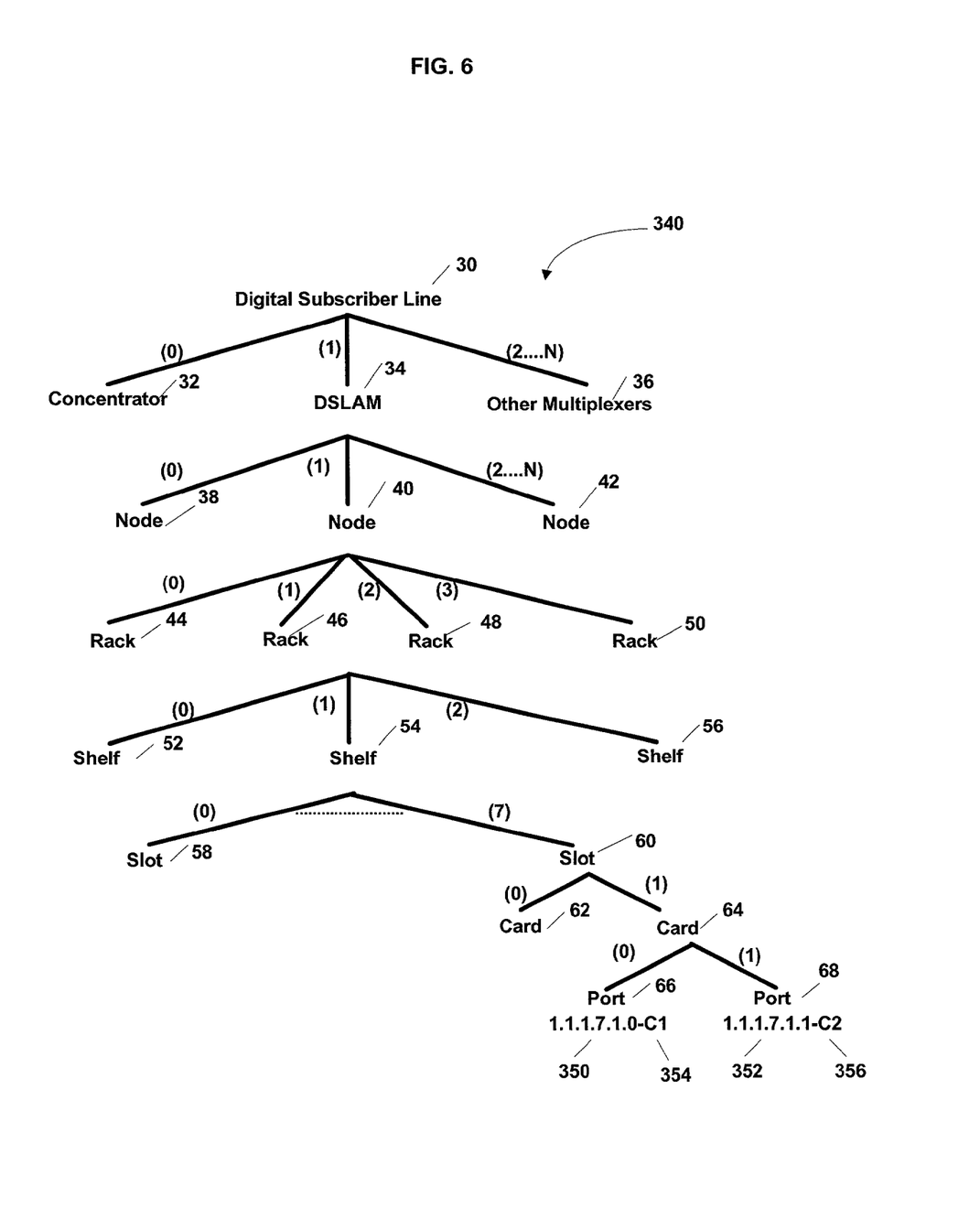
FIG. 6 is a diagram of an exemplary relational structure of objects stored in a network element database with customer identifiers assigned to network elements in the lowest sub-tree layer according to one embodiment of the present invention.

The mapping module 106 uses object-oriented technology to construct an object model that represents the managed network of interest. In addition to building a relationship between NEs, mapping module 106 relates the NEs to customers. FIG. 6 depicts, for example, a DSL sub-tree 340 including node 1, rack 1, shelf 1, slot 7, card 1, and ports 0 and 1. The address 350 of port 0 might be written as a predetermined character string, each string having a series of substrings, and wherein each substring corresponds to a network element having a relationship with the customer. For example, the address for port 0 may be written as 1.1.1.7.1.0, which corresponds to the address formats commonly used to identify NEs in operations systems and vendor management messages. While the address in this example begins with a DSLAM node, it should be noted that addressing could begin at any abstraction layer.

During the service provisioning process, according to one embodiment, mapping module 106 assigns a customer identifier to each NE in a managed node instance. The NE addresses 350, 352 are used as pointers to both the instance and the NE. The NE address also indicates where the associated customer identifiers 354, 356 will be found. According to one embodiment, the mapping module 106 may assign customer identifiers 354, 356 to the NEs at the lowest sub-tree layer, such as the port level 66, 68 in FIG. 5. A customer designated as "C1," for example, receives service through port 0 while customer "C2" receives service through port 1.

According to another embodiment, the mapping module 106 may implement other assignment policies. For example, referring to FIG. 7, if the same customer uses both port 0 and port 1, the mapping module 106 would assign the customer identifier 358 to the card sub-tree layer for card 1, rather than assigning a customer identifier to each port. According to such an embodiment, all the NEs at the lowest sub-tree layer have the same customer identifier, "C3." Either policy may be implemented at any sub-tree layer from which all the commonly assigned network elements derive.

Figure 7:
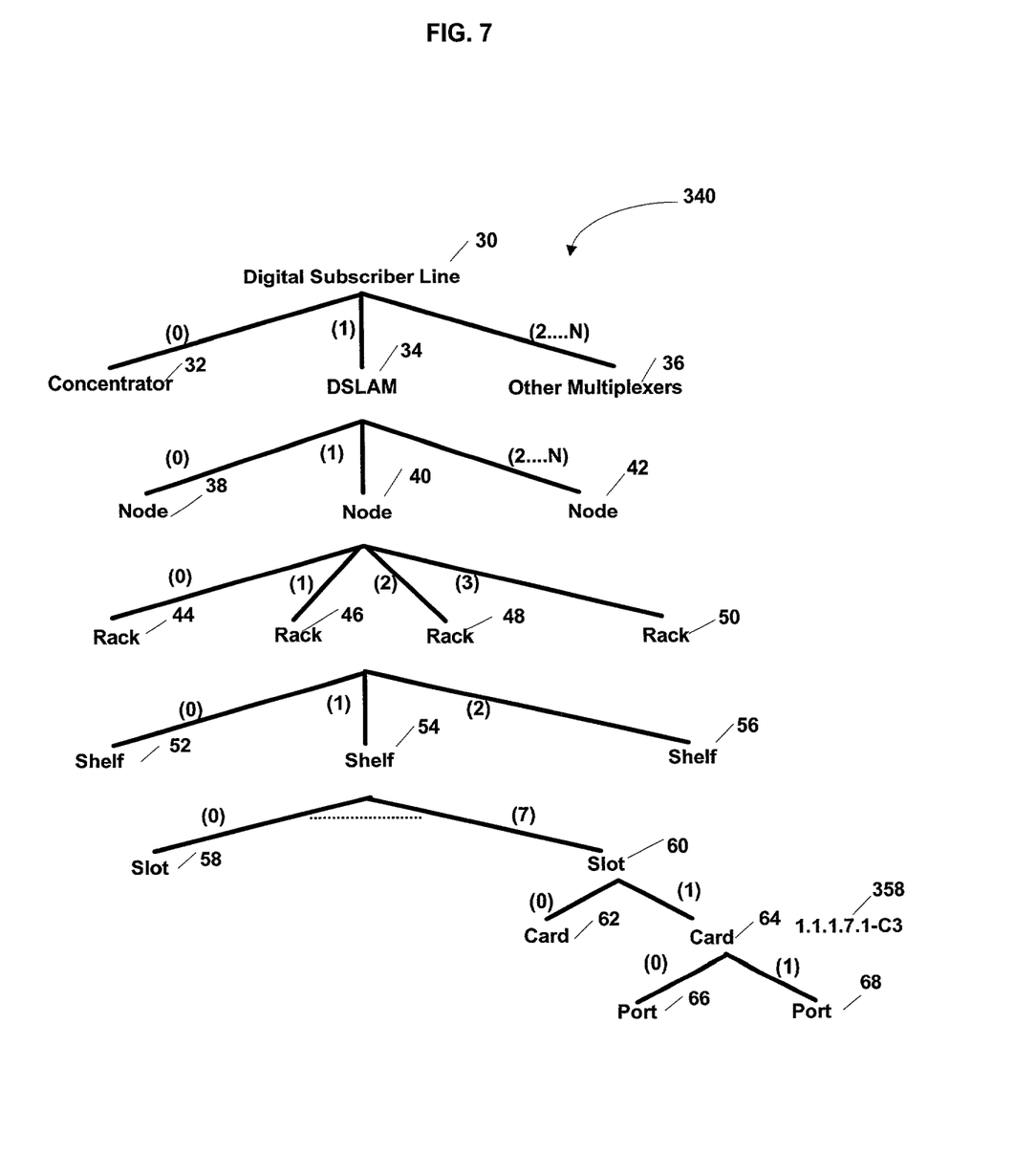
FIG. 7 is a diagram of an exemplary relational structure of objects stored in a network element database with customer identifiers assigned to network elements in the second lowest sub-tree layer according to one embodiment of the present invention.

Implementing such an assignment policy creates two possible situations when an NE address points to an NE having a sub-tree. First, the addressed NE contains a customer identifier, indicating that the addressed NE and all the NEs in any of its sub-trees map to this customer identifier. Second, when the addressed NE does not contain a customer identifier the NE affects more than one customer identifier. According to such an embodiment, the mapping module 106 would obtain a list of the affected customer identifiers by proceeding recursively through all of its sub-trees. In addition to creating a list of customers that use a certain network element, the bi-directional capability of the NE-to-customer object model allows network operators to create a list of NEs used by a customer, given the customer identifier.

According to another embodiment, mapping module 106 may include an additional mapping process that relates customers to services. DSL service, for example, may use some of the same equipment as, for example, frame relay service. In this situation, relating customers to services allows service providers to determine which service will be affected by, for example, maintenance activity on a certain network element. According to such an embodiment, the network-to-customer object model includes a service management sub-tree layer where each supported service has a set of instances corresponding to the NEs through which the service is provided. During provisioning, mapping module 106 would assign a customer identifier to an NE instance belonging to the set of instances defined for a given service. This process requires that the NE address be applied to the set of instances for each service and a customer identifier assigned. If no customer identifier is found in the set of instances for a service, then this service does not use the NE. Otherwise, mapping module 106 creates a list of customer identifier/service name pairs associated with the NE.

As a practical example, the present invention enables a network operator planning to remove a certain network element from service to compile a list of customers that will be affected by the outage. The operator begins by searching the "network element-to-customer" model 108 for the network element address of, for example, shelf 54 from FIG. 7. A search for network element address 1.1.1 begins at the layer corresponding to DSLAM 34 and yields shelf 54. Where shelf 54 does not have an assigned customer identifier, the network operator concludes that shelf 54 services more than one customer. To identify which customer or customers will be affected by the outage, the operator proceeds to search recursively through the sub-tree below shelf 54 to compile a list of customer identifiers. The resulting list of customer identifiers, which will include customer "C3" whose identifier was assigned to card 64, allows the network operator to contact those customers in advance of the outage. Where the model 108 includes a service management layer, the operator will be able to communicate which services will be affected by the outage. This example is provided for illustration purposes only and is not intended to limit the scope of the present invention in any way.

It should be understood that the invention is not limited by the foregoing description of preferred embodiments, but embraces all such alterations, modifications, and variations in accordance with the spirit and scope of the appended claims.

What is claimed is:

1. An object-oriented system that relates network components with a customer, the system comprising:
   a mapping module in communication with a network component data module and with a customer data module to create an object-oriented model of the network components, wherein the network component data module contains network component data arranged in a form that can be manipulated using an object-oriented application, wherein the object-oriented model includes:
   at least one output of the mapping module, the at least one output comprising:
      a plurality of sub-tree layers, wherein each layer represents a layer of abstraction, wherein a root represents the highest sub-tree layer and the highest level of abstraction; and a plurality of customer identifiers assigned to network components to relate each identified customer with network components servicing that identified customer at a lowest abstraction layer.

2. The system of claim 1, further comprising the network component data module.

3. The system of claim 1, further comprising the customer data module.

4. The system of claim 1, wherein the customer identifiers are unique relative to other customer numbers.

5. The system of claim 1, wherein the mapping module provides a bi-directional mapping that relates network components to the customer and that relates the customer with network components.

6. The system of claim 1, wherein the network component data module and the customer data module are a network management system in communication with the mapping module.

7. The system of claim 1, wherein the mapping module is configured to assign the customer identifier to the network component at a second lowest abstraction layer when all of the network components in the lowest abstraction layer provide service to the same customer.

8. The system of claim 1, wherein the at least one output of the mapping module further comprises:
a service management sub-tree layer wherein each supported service has a set of instances corresponding to the network components that provide the service.

9. The system of claim 1, wherein each customer identifier in the plurality of customer identifier comprises a predetermined character string, and wherein each character string has a series of substrings, and wherein each substring corresponds to a network component having a relationship with the customer.

10. An object-oriented system that relates network components with a customer, the system comprising:
a mapping module in communication with a network component data module and with a customer data module, the mapping module comprising:
means for creating an object-oriented model of network components from network component data arranged in a form that can be manipulated using an object-oriented application, and wherein the object-oriented model includes:
a plurality of sub-tree layers, wherein each layer represents a layer of abstraction, wherein a root represents the highest sub-tree layer and the highest level of abstraction; and
a plurality of customer identifiers assigned to network components to relate each identified customer with network components servicing that identified customer at a lowest abstraction layer.

11. The system of claim 10, further comprising the network component data module.

12. The system of claim 10, further comprising the customer data module.

13. The system of claim 10, wherein the customer identifiers are unique relative to other customer numbers.

14. The system of claim 10, wherein the mapping module provides a bi-directional mapping that relates network components to the customer and that relates the customer with network components.

15. The system of claim 10, wherein the mapping module includes:
means for assigning the customer identifier to the network component at a second lowest abstraction layer when all of the network components in the lowest abstraction layer provide service to the same customer.

16. The system of claim 10, wherein the mapping module further comprises:
means for creating a service management sub-tree layer, wherein each supported service has a set of instances corresponding to the network components that provide the service.

17. The system of claim 10, wherein the mapping module further comprises:
means for a creating a customer identifier that indicates the relationship between a plurality of network components and the customer.

18. A method for relating network components with a customer, the method comprising:
creating a mapping module in communication with a network component data module and a customer data module;
creating an object-oriented model of network components from network component data arranged in a form that can be manipulated using an object-oriented application, wherein the object-oriented model includes a plurality of sub-tree layers, wherein each layer represents a layer of abstraction, and wherein a root represents the highest sub-tree layer and the highest level of abstraction; and
assigning a customer identifier at a lowest abstraction layer to a network component for identifying the customer associated with that network component.

19. The method of claim 18, further comprising:
gathering the network component data; and
arranging the network component data into the form that can be manipulated using the object-oriented application.

20. The method of claim 18, further comprising:
gathering customer data for use in assigning the customer identifier to the network components.

21. The method of claim 18, wherein the customer identifier is unique relative to other customer identifiers.

22. The method of claim 18, further comprising:
relating a customer to a service when a network component may provide multiple services.

23. The method of claim 18, further comprising:
updating the relationships between the network components and the customer identifiers based on gathering network component data and gathering customer data.

24. The method of claim 18, further comprising:
updating the relationships between the network components and the customer identifiers in accordance with the assigning step.

25. An object-oriented system that relates network components with a customer, the system comprising:
a mapping module in communication with a network component data module and a customer data module, the mapping module comprising:
means for creating an object-oriented model of network components from network component data arranged in a form that can be manipulated using an object-oriented application, wherein the object-oriented model includes a plurality of sub-tree layers, wherein each layer represents a layer of abstraction, and wherein a root represents the highest sub-tree layer and the highest level of abstraction; and
means for assigning a customer identifier at a lowest abstraction layer to a network component for identifying the customer associated with that network component.

26. The system of claim 25, further comprising:
means for gathering the network component data; and
means for arranging the network component data into the form that can be manipulated using the object-oriented application.

27. The system of claim 25, further comprising:
means for gathering customer data for use in assigning the customer identifier to the network components.

28. The system of claim 25, wherein the customer identifier is unique relative to other customer numbers.

29. The system of claim 25, further comprising:
means for relating a customer to a service when a network component may provide multiple services.

30. The system of claim 25, further comprising:
means far updating the relationships between the network components and the customer identifiers based on gathering network component data and gathering customer data.

31. The system of claim 25, further comprising:
means for updating the relationships between the network components and the customer identifiers in accordance with the assigning step.

32. A computer-readable medium having stored thereon instructions which, when executed by a processor, cause the processor to perform the at least the following:
create a mapping module in communication with a network component data module and a customer data module;
create an object-oriented model of network components from network component data arranged in a form that can be manipulated using an object-oriented application, wherein the model includes a plurality of sub-tree layers, wherein each layer represents a layer of abstraction, and wherein a root represents the highest sub-tree layer and the highest level of abstraction; and
assign a customer identifier at a lowest abstraction layer to a network component for identifying the customer associated with that network component.

33. The medium of claim 32, having stored thereon instructions which, when executed by the processor, cause the processor to perform at least the following:
gather the network component data; and
arrange the network component data into the form that can be manipulated using the object-oriented application.

34. The medium of claim 32, having stored thereon instructions which, when executed by the processor, cause the processor to perform at least the following:
gather customer data for use in assigning the customer identifier to the network components.

35. The medium of claim 32, wherein the customer identifier is unique relative to other customer identifiers.

36. The medium of claim 32, having stored thereon instructions which, when executed by the processor, cause the processor to perform at least the following:
relate a customer to a service when a network component may provide multiple services.

37. The medium of claim 32, having stored thereon instructions which, when executed by the processor, cause the processor to perform at least the following:
update the relationships between the network components and the customer identifiers based on gathering network component data and gathering customer data.

38. The medium of claim 32, having stored thereon instructions which, when executed by the processor, cause the processor to perform at least the following:
update the relationships between the network components and the customer identifiers in accordance with the assigning.

\* \* \* \* \*